United States Patent [19]

Garcia

[11] Patent Number: 4,602,415
[45] Date of Patent: Jul. 29, 1986

[54] WHEEL MOUNTING DEVICE

[76] Inventor: Jerry Garcia, 1419 Stewart Ave., Baldwin Park, Calif. 91706

[21] Appl. No.: 644,062

[22] Filed: Aug. 24, 1984

Related U.S. Application Data

[63] Continuation-in-part of Ser. No. 533,054, Sep. 16, 1983, abandoned.

[51] Int. Cl.⁴ ............................................. B25B 27/14
[52] U.S. Cl. .................................................... 29/273
[58] Field of Search ............... 29/273; 81/177 B, 15.2; 7/100, 138, 166; 157/1.1, 1.11; 254/120, 131

[56] References Cited

U.S. PATENT DOCUMENTS

| | | |
|---|---|---|
| 955,790 | 4/1910 | Givens . |
| 1,384,405 | 7/1921 | Putnam . |
| 1,494,269 | 5/1924 | Meyers . |
| 1,920,350 | 8/1933 | Bourdon . |
| 2,770,873 | 11/1956 | Ramsey ................................. 29/273 |
| 3,018,492 | 1/1962 | Rosen . |
| 3,048,919 | 8/1962 | Bald . |
| 3,319,327 | 5/1967 | Dombeck . |
| 3,348,294 | 10/1967 | Gerardi . |
| 3,649,976 | 3/1972 | Isom . |
| 4,097,979 | 7/1978 | Interdonuto ........................ 29/273 |

FOREIGN PATENT DOCUMENTS

| | | | |
|---|---|---|---|
| 454707 | 2/1949 | Canada ................................. | 29/273 |
| 498373 | 12/1953 | Canada ................................. | 29/273 |
| 603079 | 4/1926 | France ................................. | 29/273 |
| 681492 | 2/1930 | France ................................. | 29/273 |

Primary Examiner—Robert C. Watson
Attorney, Agent, or Firm—Erik M. Arnhem

[57] ABSTRACT

A wheel mounting device, comprising a handle mounted centered and normal to one surface of a crossbar, cylindric arms extending, respectively from the opposite surface of the crossbar, terminating in undercut heads having, respectively diameters larger than those of the arms, and a roller frame detachably mounted to the crossbar for manipulating the position of the wheel relative to a hub.

3 Claims, 8 Drawing Figures

WHEEL MOUNTING DEVICE

CROSS-REFERENCES TO RELATED APPLICATIONS

This application is a continuation-in-part application of patent application Ser. No. 533,054, filed Sept. 16, 1983 in the Patent and Trademark Office, now abandoned.

BACKGROUND OF THE INVENTION (1) Field of the Invention

My invention relates to a device, which is specifically designed to mount wheels on pick-up trucks, diesel trucks, rigs, trailers and even tractors. These wheels, generally, are very heavy, weighing about 300 pounds, and cannot be manually lifted into aligning position with a jacked-up wheel hub of such vehicles; nor are any of the existing wheel mounting devices capable of so doing.

(2) Prior Art

The wheel mounting device of this invention is classified as follows: Class 157/1.1 and 1.11; Class 81/15.2; Classes 254/20 and 131; and Class 29/273.

U.S. Pat. No. 3,649,976 issued to William Isom Mar. 21, 1972 illustrates a combination tool, which is applied to a jack, and engages the lowermost part of a tire.

U.S. Pat. No. 1,920,350 issued to P. M. Bourdon Aug. 1, 1933 discloses a device for mounting wheels on hubs, although this device includes bifurcated arms, its structure and application differ completely from that of my invention.

U.S. Pat. No. 3,048,919 issued to W. L. Bald Aug. 14, 1962 illustrates another wheel mounting tool, comprising a rod, a handle and a pivoting member supporting the handle.

U.S. Pat. Ser. No. 955,970 (Givens), U.S. Pat. Nos. 1,384,405 (Putnam); 1,494,269 (Meyers); 3,018,492 (Rosen); 3,319,377 (Dombeck); and 3,348,294 (Gerardi) are being cited as being of general interest with respect to my invention.

SUMMARY OF THE INVENTION

In addition to what was described above, my invention relates to an integral device, having predeterminedly spaced apart bifurcated applicators, which—when a wheel is placed adjacent to a wheel hub for mounting thereon—is caused to pass through two of the apertures in the wheel rim and upwardly to interlock with studs on the wheel hub. In using leverage on the invented device, the wheel may be lifted almost effortless and, sliding on the bifurcated applicators, the applied rim apertures will drop over the hub studs, causing the remaining wheel rim apertures to simultaneously apply themselves over the studs.

It is therefore an object of the invention to provide a tool which has no moving parts but is capable of lifting and mounting heavy wheels on vehicle hubs.

It is another object of the invention to provide a tool which almost effortless may be applied to mount such wheels on the vehicle.

DESCRIPTION OF THE INVENTION

Figure 1:
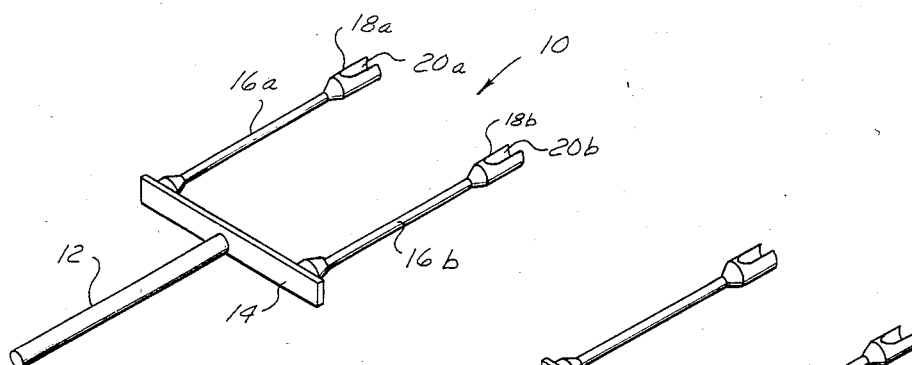
FIG. 1 is a perspective view of a first embodiment of a wheel mounting device according to the invention.

In the drawings like reference characters designate similar parts in the several views of the drawings.

Figure 2:
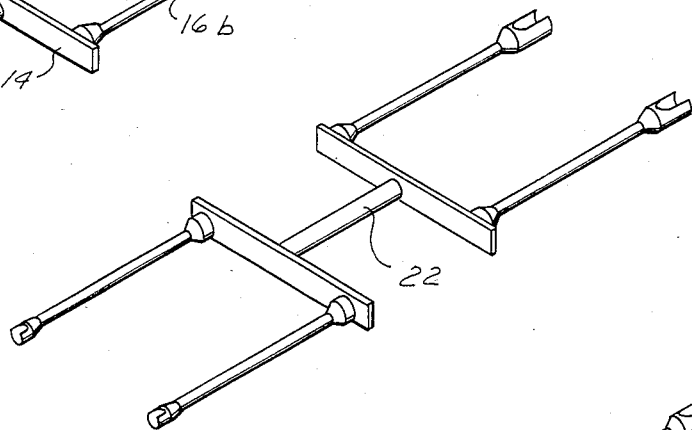
FIG. 2 is a perspective view of a modified embodiment of the device in FIG. 1.
Figure 3:
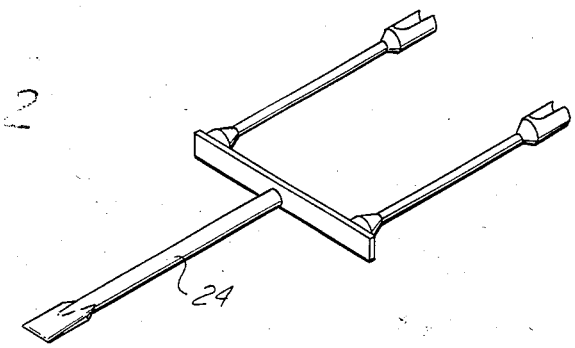
FIG. 3 is a perspective view of still another modified embodiment of the device.

In FIG. 1, numeral 10 indicates the device in its entirety; having a preferably solid handle 12, mounted integrally and centered normal to a crossbar or arm support 14, and two cylindric arms 16a, 16b bifurcating parallel with handle 12 from the ends of a second surface of crossbar 14; the arms 16 terminate respectively in hollow cylindric open-ended applicator means or heads 18a, 18b which are undercut to form elongated apertures 20a, 20b, respectively in the surface of heads 18, as illustrated in FIGS. 1–3. The diameter of the heads 18 is somewhat smaller than that of the wheel rim apertures 28, through which the heads 18 are inserted. The diameter of the arms 16 is suitably half of that of its heads 18 to ensure that the arms 16, when passing through the wheel rim apertures 28, will have ample of clearance to move upwardly, downwardly and sidewise. The arms 16 are predeterminedly spaced apart to correspond to the distance between wheel rim apertures 28 and studs 32 of the wheel hub 30 (FIG. 4).

Figure 4:
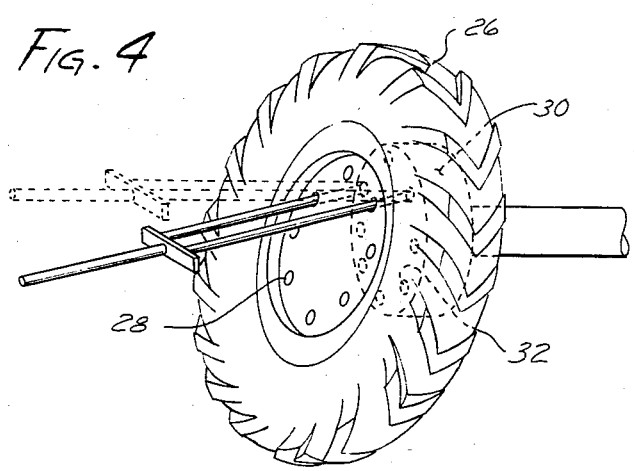
FIG. 4 illustrates, in a perspective view, the device as applied to a wheel to be mounted onto a vehicle hub.

FIG. 4 illustrates the device 10 in position to mount a wheel 26 on a vheicle hub 30.

Wheel 26 is placed in a leaning position against hub 30. The user may hold handle 12 of the device with one hand only and insert arms 16 with heads 18 (the undercut portions 20 of which are down) through wheel rim apertures 28. Due to the relative slim diameter of arms 16, the user may direct the latter upwardly towards two of the studs 32 projecting from hub 30 and cause the undercut portions 20 of heads 18 to interlock with or grip studs 32. In utilizing the thusly created leverage, the user may now with one hand lift wheel 26 to the higher jacked-up position of hub 30, so that wheel rim apertures 28 will slide on arms 16 and drop down over the studs 32, causing the remaining rim apertures 28 to fall in place over oppositely locating studs 32. When the wheel is, thusly mounted, with the hub having entered the wheel axle hole and the studs within the wheel rim apertures, the wheel is rigidly fastened by nuts screwed onto the projecting studs. The typical diameter of each of the rim apertures 28 is about 1¼ and the distance between arms 16 is equal to the distance between three rim apertures or maximally about 5½". The wheels and vehicle hubs of diesel trucks and the like have ten rim apertures, respectively ten hub studs. When hub 30 and wheel 26 are so positioned that one of the studs 32 and apertures 28 are coinciding at their highest point, the mounting of apertures 28 over studs 32 may be accomplished, e.g., in the case of a passenger car or pick-up truck, by use of one hand only. Where studs and apertures do not face one another, the user may manipulate the wheel with the other hand to bring the apertures into a proper coinciding position with the hub studs.

When the wheel, thus is mounted on all hub studs, the device 10 is subsequently removed and conventional lug nuts are securely applied to the studs.

Device 10 may as well be used for mounting twin wheels on heavier vehicles. The application is basically the same as described above. However, the first wheel is fastened to the hub studs by means of projecting intermediate threaded nuts, while the second wheel rim apertures are applied over the intermediate nuts and rigidly secured thereto by means of conventional lug nuts threaded on the intermediate nuts.

FIG. 2 illustrates a device similar to that of FIG. 1, but provided with two pairs of arms, extending oppositely one another from individual crossbars 14, and one handle 22 mounted to and between facing surfaces of the crossbars, the heads 18 of each pair of arms having somewhat different dimensions. This device is utilized for certain types of heavy vehicles or tractors equipped with front and rear wheels having differently dimensioned rim apertures and hub studs, respectively.

FIG. 3 shows the device 10 with its handle shaped as a crowbar 24, which may facilitate the handling of the wheels.

Figure 5:
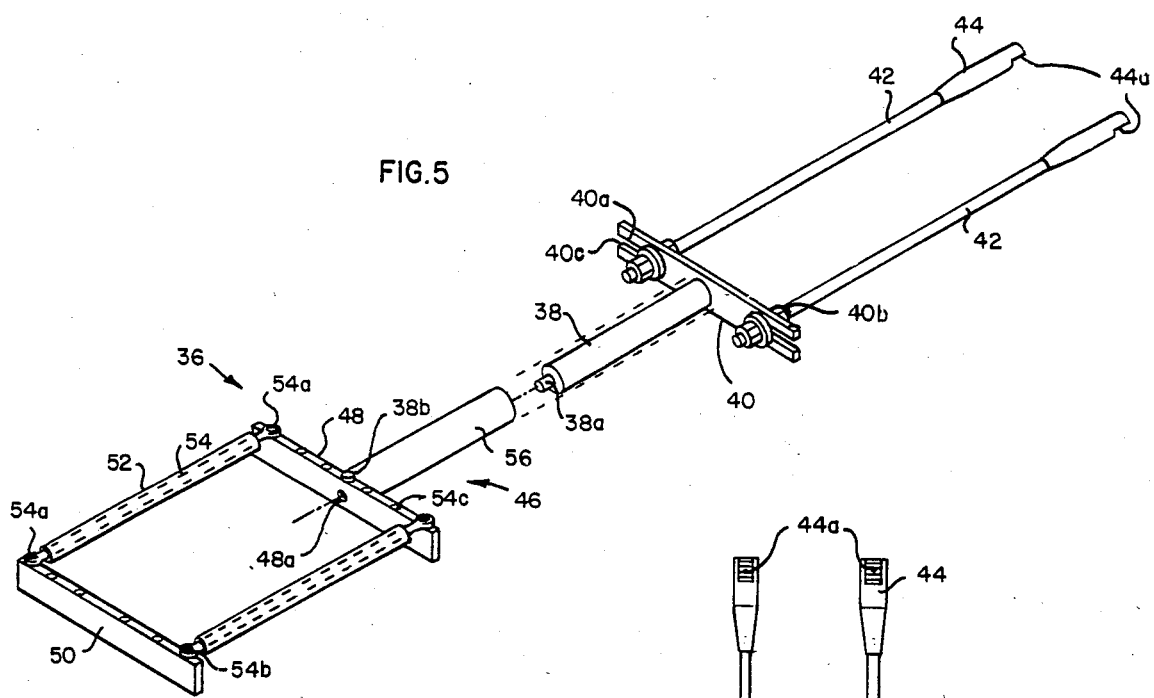
FIG. 5 is a top perspective view of a second embodiment of the wheel mounting device.

In the second embodiment of my invention, the tool in FIG. 5 is identified by numeral 36. One end of handle 38 is integrally mounted to a center portion of horizontally extending crossbar 40, from which two arms 42 extend rightangularly, having threaded end portions 42a, and, terminating, respectively in applicator means or heads 44. The free end of handle 38 terminates in a nipple 38a.

Tire rolling means, e.g. a frame 46 comprising an upper crossbar 48 and a lower crossbar 50 flanked by two spaced apart rollers 52, which rotates, respectively on axles 54; the latter extending interior of rollers 52, as indicated by dotted lines on the drawings and terminate in exterior eyes 54a, which are fastened, e.g., by means of screws 54b, driven there through into apertured edge portions (seen at 54c) of cross bar 48 and 50. Several, such apertures 54c are provided, which will enable the user to widening or shortening the distance between rollers 54, in order to accommodate variable sizes of tires.

Upper crossbar 48 has a centered aperture 48a, about which sleeve 56 is mounted integrally to crossbar 48 extending therefrom rectangularly outward to receive handle 38 with its nipple 38a penetrating aperture 48a and held securely but detachably therewithin by means of a set screw 38b.

Crossbar 40 of the tool is provided with slotted end portions 40c within which the threaded end portions 42a of arms 42 may be rigidly but adjustably mounted by means of double nut-washer units 40b, applied at both sides of crossbar 40 for tightening of each arm 42 at selected position in slot 40a. The user of the tool will then be able to shorten or widen the space between arms 42 to accommodate variable distances of the apertures in tire rims and studs of the wheel hubs.

Heads 44 of arms 42 are mounted removably onto the upper end of the latter, by means of set screws 44b driven into threaded apertures (not shown) in heads 44. The interior undercut portions of heads 44 are serrated at 44c to facilitate their grip when applied underneath the studs of the wheel hubs.

In being able to substitute one set of heads 44 for another, the user of the tool may vary the sizes of the heads to fit variable dimensions of hub studs.

Figure 6:
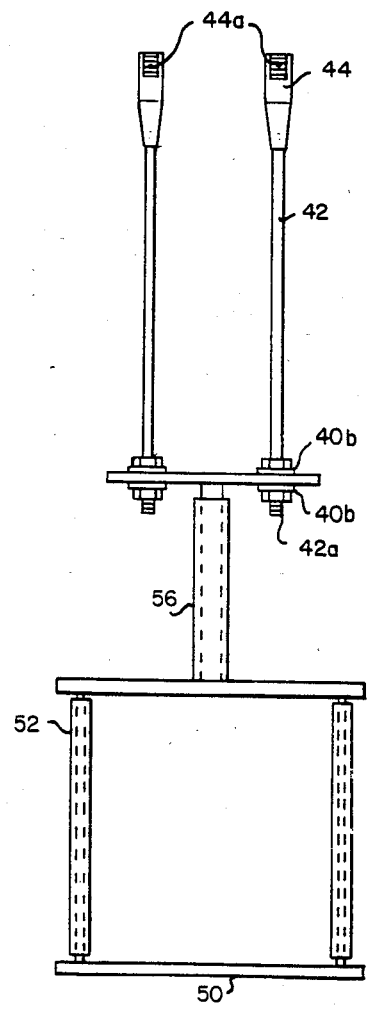
FIG. 6 is a bottom plan view of the device in FIG. 5.

The tool, according to FIGS. 5 and 6 is primarily designed to handle mounting of tires on smaller vehicles, such as pick-up trucks.

In operating the tool, the user places the roller frame, separated from the tire mounting tool, in front of the jacked-up hub, (if necessary steps on sleeve 56 of the roller frame, to hold the latter to the ground), rolls the tire over rollers 52, utilizing the rollers to manipulate the tire so that its rim apertures exactly faces the studs of the wheel hub. The user then rolls the tire sidewise off the frame and removes the latter. When the user now rolls back the tire to its former position facing the hub, the rim apertures of the tire and studs of the hub are again coinciding and very little effort is now expended to insert heads 42 of the tool—with its undercut portion down—through the tire rim apertures, raising the tool by its handle and apply the rim apertures over the stubs of the hub; the mounting operation has already been explained in detail in conjunction with the first embodiment of my invention.

The crossbars of the roller frame is at sufficient height from the ground to allow the roller to freely rotate when adjusting the position of the tire in front of the hub.

Figure 7:
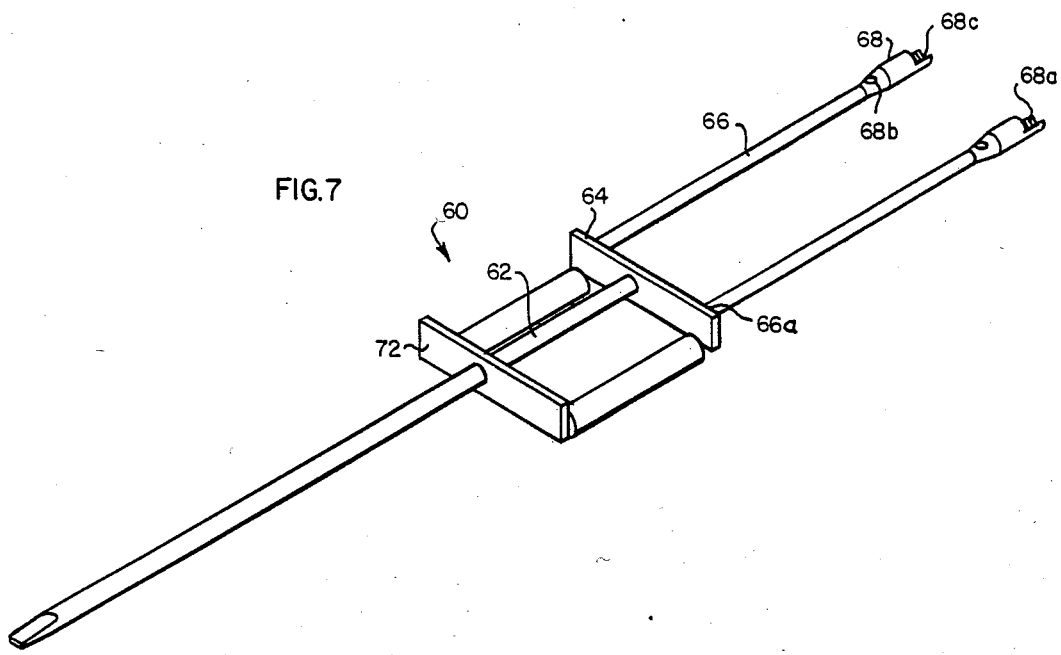
FIG. 7 is a bottom perspective view of a modified embodiment of the device in FIGS. 5 and 6.
Figure 8:
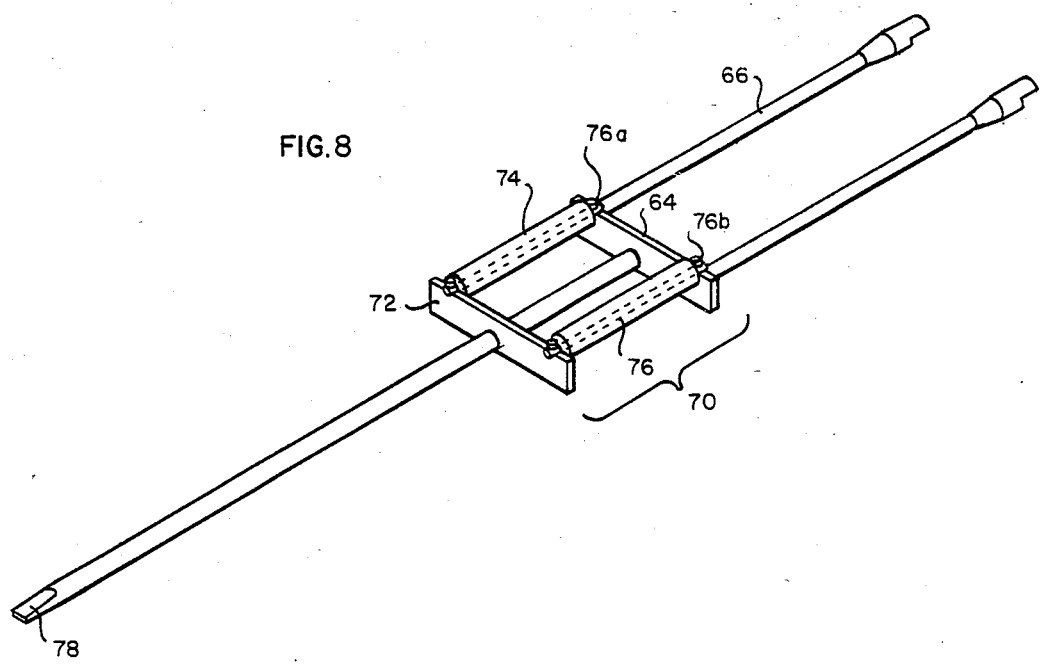
FIG. 8 is a top perspective view of the device in FIG. 7.

FIGS. 7 and 8 illustrate the third embodiment of the tool 60, which is of heavy construction and intended for use on rigs and the like.

Arms 66 are welded to the crossbar 64 at 66a (but obviously could be mounted adjustably to the crossbar, as in FIGS. 5 and 6); the heads 68 with undercut portions 68a serrated at 68c are constituted as their counterparts in FIGS. 5, 6. Heads 68 are rigidly mounted (but exchangable for differently dimensioned heads) to arms 66 by means of set screws which are driven through the heads and into the arms. Also, handle 62 extends integrally from the underside of crossbar 64. The roller frame 70 is U-shaped, i.e. comprising a lower crossbar 72, two rollers 74, rotating freely on axles 76, respectively; each of the latter terminates in two pairs of eyes 76a through which screws 76b passes, being driven into threaded apertures (not shown) on edge portions of lower crossbar 72 and crossbar 64, respectively.

Crossbar 72 has a centered aperture through which handle 62 passes freely. U-shaped roller frame 70 is detachable from the rest of the tool by unscrewing screws 76b, which hold ends of axles 76 onto crossbar 64, and pulling roller frame 70 out of handle 62.

Rollers 74 have closed narrowly apertured ends rotating on axle 76, which lends a ball bearing effect to the rollers. The tools, as illustrated in FIGS. 5 and 7 are, basically operated in the manner, as described in detail in conjunction with the first embodiment of the tool.

While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended claims.

I claim:

1. A device for mounting a grounded apertured wheel onto a jacked-up studded hub axle of a vehicle, comprising:

(a) a crossbar, having two surfaces,
(b) a handle one end of which being mounted centered and normal onto one of the surfaces of the crossbar;

(c) two arms, terminating respectively in an undercut head, extend parallel with the handle from outer portions, respectively of the other surface of the crossbar, the cross-section of the heads of the arms being smaller than that of the aperture of the wheel but larger than the cross-section of the arms themselves, so that the arms, when inserted through the wheel apertures with the undercut portions of their heads facing downwardly will have enough clearance to be moved at least upwardly, causing their undercut heads to interlock over and with the studs of the hub axle;

(d) rolling means for adjusting the apertures of the wheel vis-a-vis the studs of the hub, including rollers and supporting means thereof, mounted onto the handle.

2. A device, according to claim 1, wherein the rolling means is detachably mounted to the handle.

3. A device according to claim 1, wherein the rolling means is a frame, comprising an upper crossbar and a lower crossbar disposed parallel spaced apart from one another and two axles, their ends, respectively being mounted onto end portions of and spanning the space between the upper and lower crossbar, and rollers, mounted rotatably, respectively on the axles.

* * * * *